UNITED STATES PATENT OFFICE.

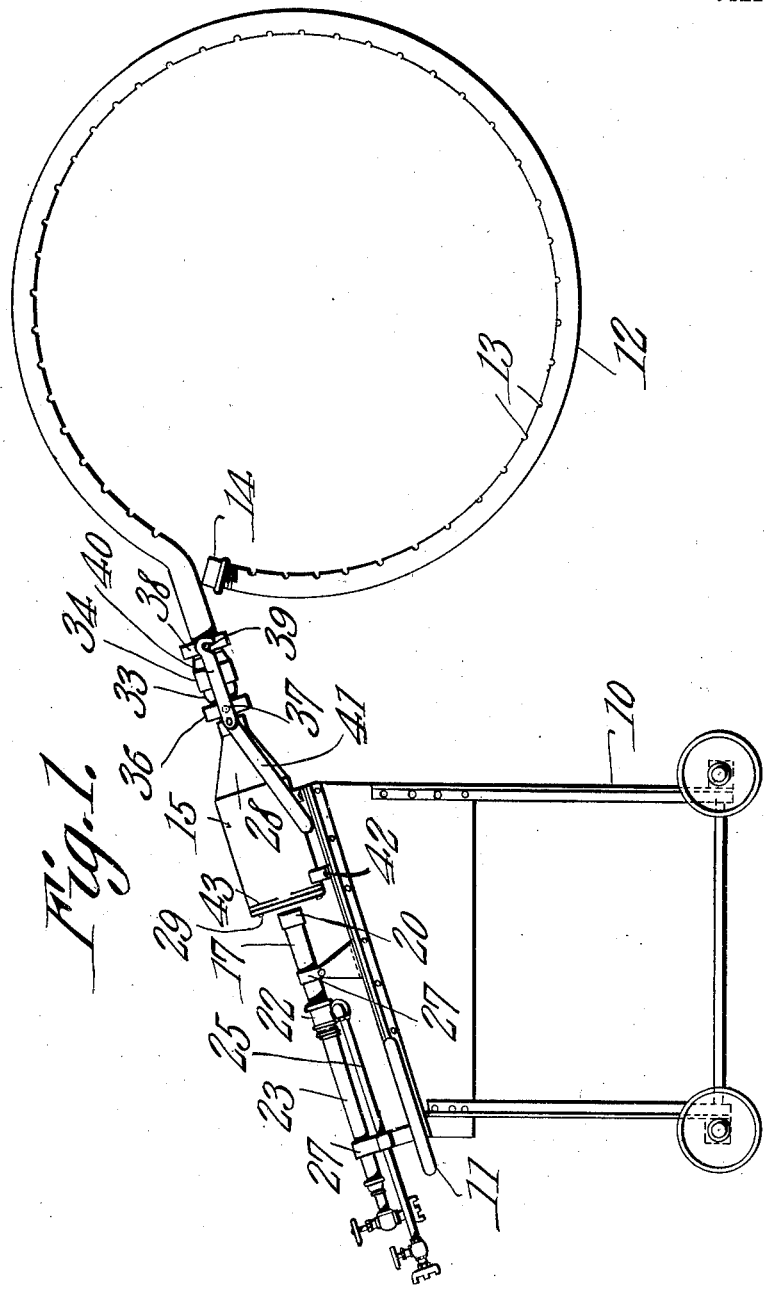

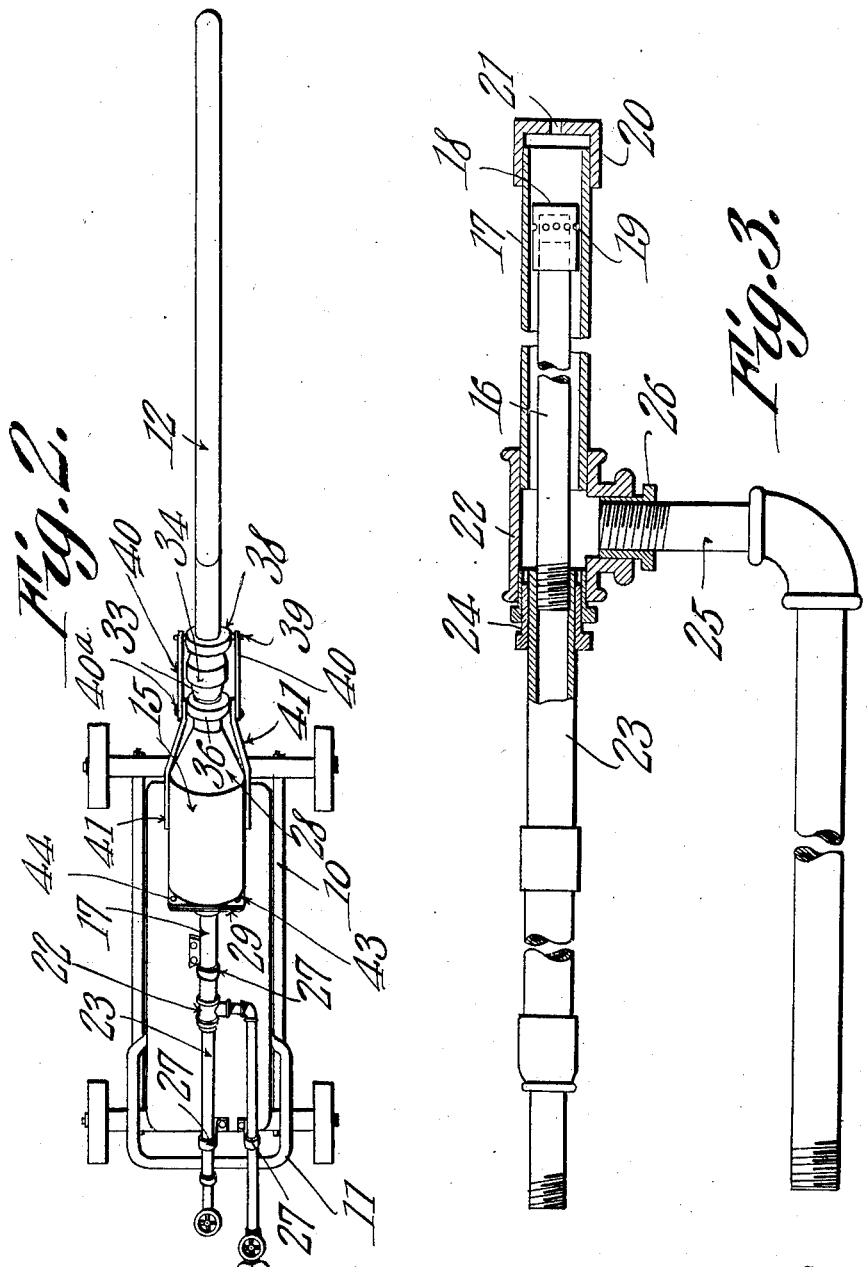

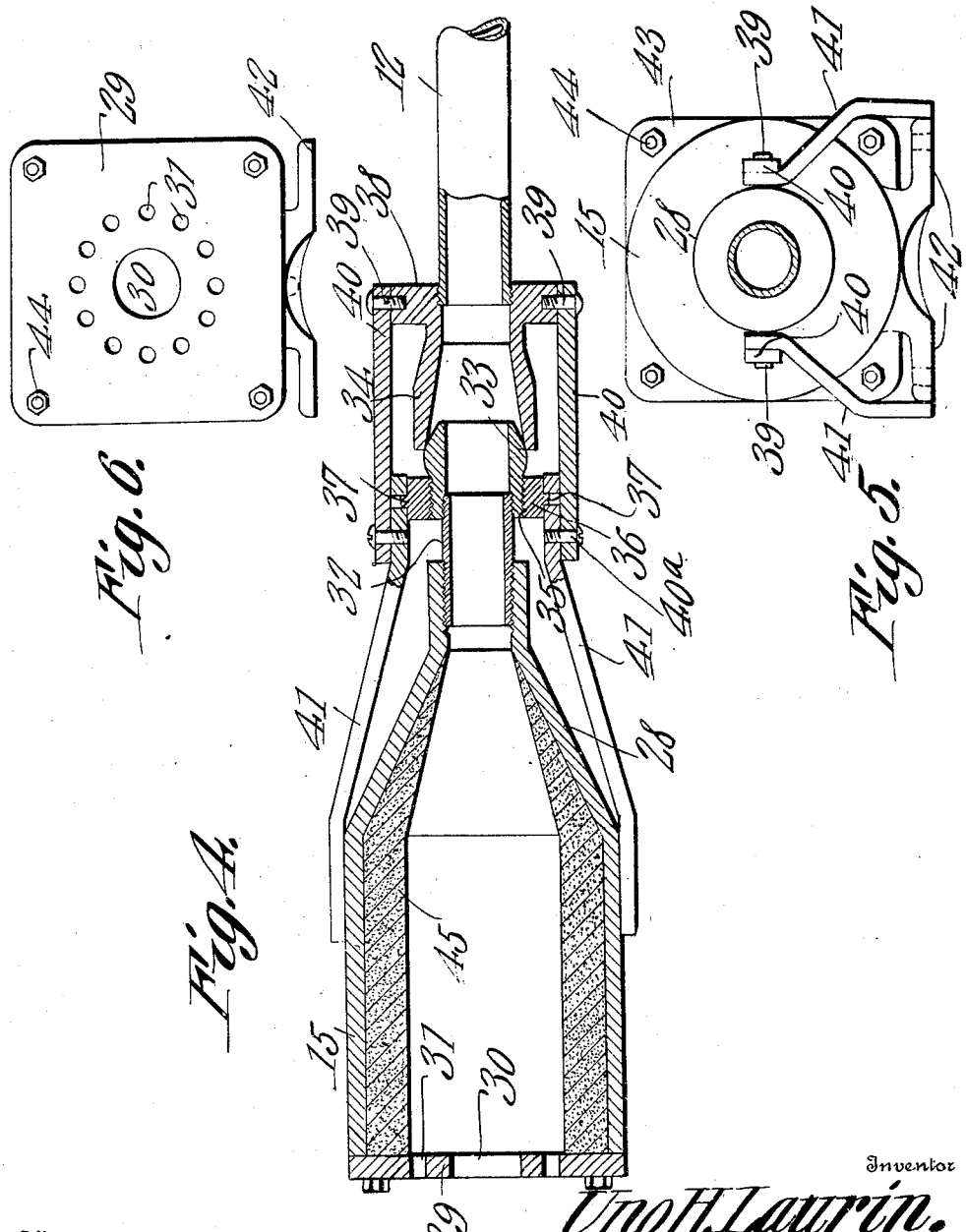

UNO H. LAURIN, OF CLEVELAND, OHIO.

TIRE-HEATER.

964,795.   Specification of Letters Patent.   Patented July 19, 1910.

Application filed January 24, 1910. Serial No. 539,805.

*To all whom it may concern:*

Be it known that I, UNO H. LAURIN, a citizen of Russia, residing at Cleveland, in the county of Cuyahoga and State of Ohio, have invented a new and useful Tire-Heater, of which the following is a specification.

This invention relates to improvements in apparatus for heating the tires of locomotives and car wheels to effect their removal, and it has for its object to provide an apparatus of this kind embodying certain novel features of construction to be hereinafter described and claimed.

The invention is illustrated in the accompanying drawings forming a part of this specification, in which drawings, Figure 1 is an elevation of the entire apparatus in position for use. Fig. 2 is a plan view. Fig. 3 is a sectional view of the spraying device of the burner. Fig. 4 is a longitudinal section of the mixing chamber of the burner. Fig. 5 is a front end view of said chamber. Fig. 6 is a rear end view thereof.

As shown in the drawings, the apparatus is mounted on a truck 10 in order that it may be conveniently moved about in the shop to the different wheels from which the tires are to be removed. The truck is provided with a suitable handle 11.

The burner proper is a pipe 12 which is annular in form so that it may be positioned to encircle the tire to be heated, there being burner openings 13 in the inner side of the pipe. One end of the pipe is closed by a cap 14, and the other end is connected by means of a flexible joint to a retort chamber 15 mounted on the truck, the latter also carrying a spraying device which discharges into the chamber.

The spraying device, as shown in Fig. 3, comprises an inner tube 16, and an outer tube 17, the inner tube being closed at its discharge end by a cap 18 having side openings 19, and the outer tube being closed at its discharge end by a cap 20 having a central discharge opening 21. The outer tube is connected to one of the branches of a T-coupling 22, and to the alined branch of said coupling is connected an oil supply pipe 23, to which the inlet end of the tube 16 is connected, a suitable stuffing box 24 being provided to prevent leakage of the oil. To the side branch of the coupling is connected an air pipe 25, a suitable stuffing box 26 being also provided. The pipes 23 and 25 are provided with suitable valves for controlling the flow therethrough, and they are also provided with suitable couplings for connection to pipes leading to the source of fuel and compressed air supply. The fuel is contained in a tank under pressure so that a force-feed is obtained.

The inner and outer tubes 16 and 17 are spaced from each other so that the air entering the outer tube through the pipe 25, may flow past the openings 19, and out through the opening 21. The pressure on the oil, together with the suction produced at the openings 19 causes the oil to flow through said openings, and it is mixed with the air, and discharged through the opening 21 in the form of a fine spray, the action being similar to that of an atomizer.

On the top of the truck are mounted brackets 27, one of which supports the tube 17, and the others the pipes 23 and 25.

The retort chamber 15 is cylindrical in form, and tapers at one of its ends as indicated at 28. The other end of the chamber is closed by a plate 29 having a central opening 30 which is in line with the discharge opening 21 of the spraying device already described, said device and the retort chamber being in axial alinement. The opening 30 is surrounded by a circular series of air inlet openings 31.

The outlet from the retort chamber is by the way of the tapered end 28, a short pipe 32 being screwed into this end. This pipe carries a hollow spheroidal head 33 forming one of the members of a pivot joint, the other member of said joint comprising a short tube 34 having one of its ends flared to receive the head 33. To the other end of the tube is connected the pipe 12. The head 33 is formed with an externally threaded portion 35 on which a ring 36 is screwed. From diametrically opposite sides of this ring project studs 37. The member 34 is formed with a collar 38 into which are screwed diametrically opposite studs 39, engageable each by a hook 40. The shanks of the hooks are pivotally connected at 40ᵃ to levers 41 which are pivoted at one of their ends on the studs 37, the connection between the levers and the shanks of the hooks being made near the pivot of the levers. The hooks 40 are provided to prevent endwise separation of the members 33 and 34. Upon swinging the levers 41 in one direction, the hooks 40 are disengaged from the studs 39, so that the members 33 and 34 may be disconnected, and upon swinging the levers in the opposite direction, the hooks by their engagement with the studs, draw the two members together, and securely hold them in this position.

The retort chamber 15 is formed with feet 42 whereby it is secured to the top of the truck, and at its rear end are bolting flanges 43 for securing the plate 29, said flanges and plate having registering openings to receive bolts 44 by which the plate is secured.

The interior of the retort chamber is lined with carborundum sand, or some other refractory material as indicated at 45.

In operation, the truck is pushed to the locomotive or car, and the pipe 12 is adjusted to the tire to be removed. Upon turning on the oil and air, the combustible mixture is sprayed into the retort chamber 15 through the opening 30, and is ignited by any suitable means. Air also enters the chamber through the openings 31. A small quantity of oil is allowed to pass into the chamber, and upon igniting the same, the lining 45 of the chamber is rapidly heated to a white heat. More oil is now allowed to spray into the chamber, and this, upon coming in contact with the heated lining, is at once vaporized, and the highly heated vapor or gas passes into the burner and issues from the openings 13 at which it is ignited. The tapered form of the retort chamber contracts its discharge end, which results in an increased pressure in the gas or vapor. The gas or vapor burns with an intense heat at the openings 13, and as said openings are placed close together, and also entirely encircle the tire, the latter is quickly heated, so that the time required for its removal is reduced to a minimum. The cost of the operation is thus materially reduced, and there is also a considerable saving of fuel, as well as time required for the operation. The burner produces no smoke, which renders it especially useful for indoor use.

What is claimed is:

1. A tire heater comprising a support, a fuel supply chamber mounted thereon, a hollow spheroidal member mounted on the discharge end of the fuel supply chamber, a tube into one end of which the said member extends, a burner connected to the other end of the tube, and means for holding the spheroidal member and the tube against endwise separation.

2. A tire heater comprising a support, a fuel supply chamber mounted thereon, a hollow spheroidal member mounted on the discharge end of the supply chamber, projecting studs carried by said member, a tube into one end of which the spheroidal member extends, a burner connected to the other end of the tube, projecting studs carried by the tube, and hooks carried by the first-mentioned studs, and engageable with the studs of the tube.

In testimony that I claim the foregoing as my own, I have hereto affixed my signature in the presence of two witnesses.

UNO H. LAURIN.

Witnesses:
   FRED EDELBERG,
   R. A. MALEY.